US011856569B2

(12) United States Patent
Bai et al.

(10) Patent No.: US 11,856,569 B2
(45) Date of Patent: Dec. 26, 2023

(54) DCI FOR COMMON TCI STATE UPDATE

(71) Applicant: QUALCOMM Incorporated, San Diego, CA (US)

(72) Inventors: Tianyang Bai, Somerville, NJ (US); Yan Zhou, San Diego, CA (US); Jelena Damnjanovic, Del Mar, CA (US); Peter Gaal, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/150,887

(22) Filed: Jan. 15, 2021

(65) Prior Publication Data
US 2022/0232544 A1    Jul. 21, 2022

(51) Int. Cl.
*H04W 72/04*    (2023.01)
*H04W 72/10*    (2009.01)
*H04W 72/044*    (2023.01)
*H04W 72/23*    (2023.01)

(52) U.S. Cl.
CPC ......... *H04W 72/046* (2013.01); *H04W 72/23* (2023.01)

(58) Field of Classification Search
CPC .................... H04W 72/046; H04W 72/042
See application file for complete search history.

(56) References Cited

U.S. PATENT DOCUMENTS

| 2018/0234959 | A1* | 8/2018 | Ahn ...................... H04W 72/20 |
| 2019/0158317 | A1* | 5/2019 | Lee ........................ H04L 1/0038 |
| 2020/0120634 | A1  | 4/2020 | Lee et al. |
| 2021/0314953 | A1* | 10/2021 | Park ..................... H04W 72/046 |
| 2021/0337525 | A1* | 10/2021 | Rahman ................ H04W 16/28 |
| 2021/0391899 | A1* | 12/2021 | Cao ....................... H04B 17/373 |
| 2022/0061056 | A1* | 2/2022 | Farag .................... H04B 7/088 |
| 2022/0330315 | A1* | 10/2022 | Jiang ................ H04W 72/1289 |

FOREIGN PATENT DOCUMENTS

WO    2020034305 A1    2/2020

OTHER PUBLICATIONS

International Search Report and Written Opinion—PCT/US2021/064197—ISA/EPO—dated Apr. 19, 2022.
Samsung: "Further Enhancements on MIMO for NR", 3GPP Draft, 3GPP TSG RAN Meeting #90-e, RP-202299, 3rd Generation Partnership Project (3GPP), vol. TSG RAN, No. Electronic Meeting, Dec. 7, 2020-Dec. 11, 2020, Nov. 27, 2020 (Nov. 27, 2020), XP051960316, 15 Pages, Retrieved from the Internet: URL: https://ftp.3gpp.org/tsg_ran/TSG_RAN/TSGR_90e/Docs/RP-202299.zip RP-202299 SR for RAN_90e_NR-FeMIMO V2.docx [retrieved on Nov. 27, 2020] p. 2-p. 4, p. 5, p. 8.

* cited by examiner

*Primary Examiner* — Ronald B Abelson
(74) *Attorney, Agent, or Firm* — Procopio, Cory, Hargreaves & Savitch LLP

(57) ABSTRACT

Apparatus, methods, and computer program products for beam updating are provided. An example method includes receiving DCI. The method further includes determining, based on the DCI, whether the DCI is associated with a beam update for uplink, downlink, or a combination of the uplink and the downlink. The method further includes determining, from the DCI, a TCI state that indicates a beam for the uplink, the downlink, or the combination of the uplink and the downlink.

34 Claims, 9 Drawing Sheets

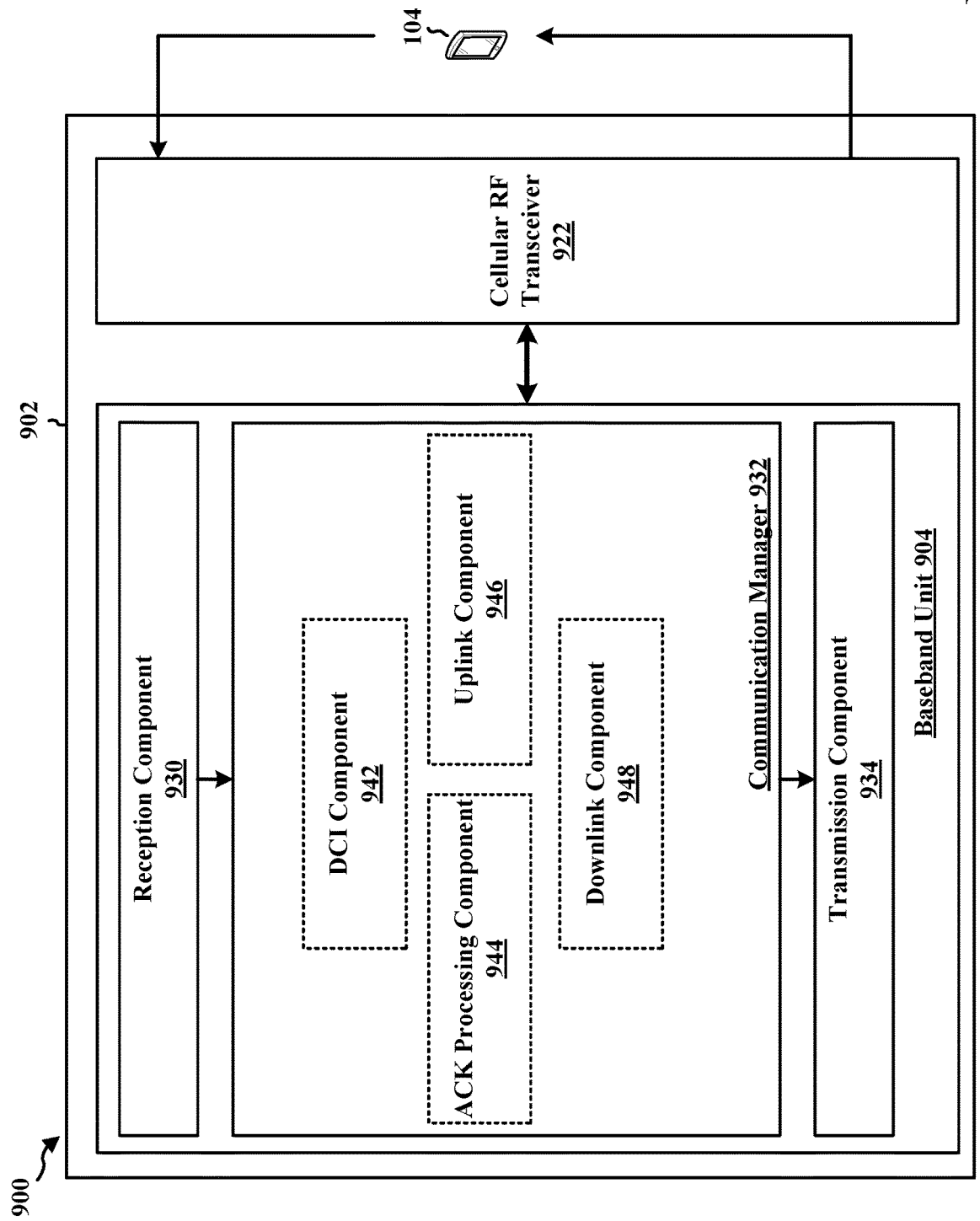

DCI FOR COMMON TCI STATE UPDATE

BACKGROUND

Technical Field

The present disclosure relates generally to communication systems, and more particularly, to wireless communication systems with beam updating.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. An example UE may receive downlink control information (DCI). The example UE may determine, from the DCI, a transmission configuration indicator (TCI) state that indicates a beam for the uplink, the downlink, or the combination of the uplink and the downlink. The example UE may determine, from the DCI, a transmission configuration indicator (TCI) state that indicates a beam for the uplink, the downlink, or the combination of the uplink and the downlink.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a diagram illustrating an example of a hardware implementation for an example apparatus.

DETAILED DESCRIPTION

Figure 1:
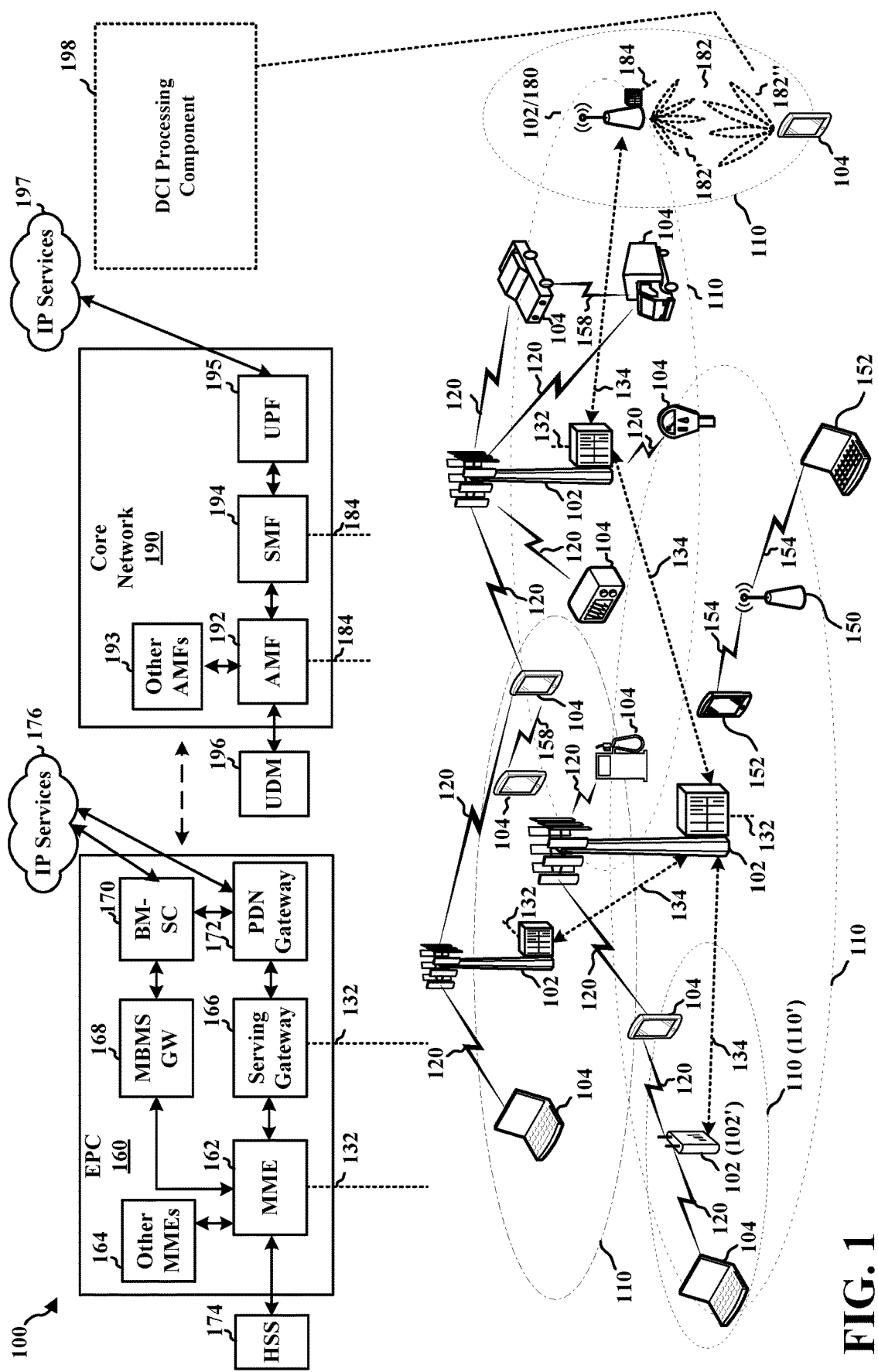
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some wireless communication systems, TCI may include a TCI state that includes at least one source reference signal (RS) to provide a reference (e.g., a basis for a UE assumption) to determine quasi-colocation (QCL) relationship or a spatial filter (e.g., beam) for wireless communication. TCI states may be used by a base station to indicate a beam change to a UE. Various types of TCI states may be used. For example, one TCI state may indicate a joint downlink (DL)/uplink (UL) common TCI state to indicate a common beam for at least one DL channel or DL RS plus at least one UL channel or UL RS. Another example TCI state may indicate a separate DL common TCI state to indicate a common beam for more than one DL channel or DL RS, e.g., and not for an UL channel or UL RS. Yet another example TCI state may indicate a separate UL common TCI state to indicate a common beam for more than one UL channel or UL RS, e.g., and not for a DL channel or DL RS. In addition, in some aspects, separate TCI states, one for DL and one for UL, may be utilized. For the separate DL TCI state, the source reference signal(s) in multiple TCIs (e.g., M TCIs with M being an integer number) provide QCL information at least for UE-dedicated reception on physical downlink shared channel (PDSCH) and for UE-dedicated reception on all or subset of control resource sets (CORESETs) in a CC.

For the separate UL TCI, the source reference signal(s) in N TCIs (e.g., with N being an integer number) may provide a reference for determining common UL TX spatial filter(s) (i.e., beams) at least for dynamic-grant/configured-grant based physical uplink shared channel (PUSCH), all or subset of dedicated physical uplink control channel (PUCCH) resources in a CC. In addition, the UL TX spatial filter can also apply to all SRS resources in resource set(s) configured for antenna switching/codebook-based/non-codebook-based UL transmissions.

In some wireless communication systems, DCI may be used to update beam indications under such a TCI framework. The DCI that indicates the beam update may further schedule transmissions such as a PDSCH or a PUSCH. Aspects provided herein enable DCI for beam updating that may flexibly schedule or not schedule a transmission.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include DCI component 198. In some aspects, the DCI component 198 may be configured to receive DCI. In some aspects, the DCI component 198 may be further configured to determine, based on the DCI, whether the DCI is associated with a beam update for uplink, downlink, or a combination of the uplink and the downlink. In some aspects, the DCI component 198 may be further configured to determine, from the DCI, a TCI state that indicates a beam for the uplink, the downlink, or the combination of the uplink and the downlink. Although the following description may be focused on 5G NR, the concepts described herein may be applicable to other similar areas, such as LTE, LTE-A, CDMA, GSM, and other wireless technologies.

Figure 2:
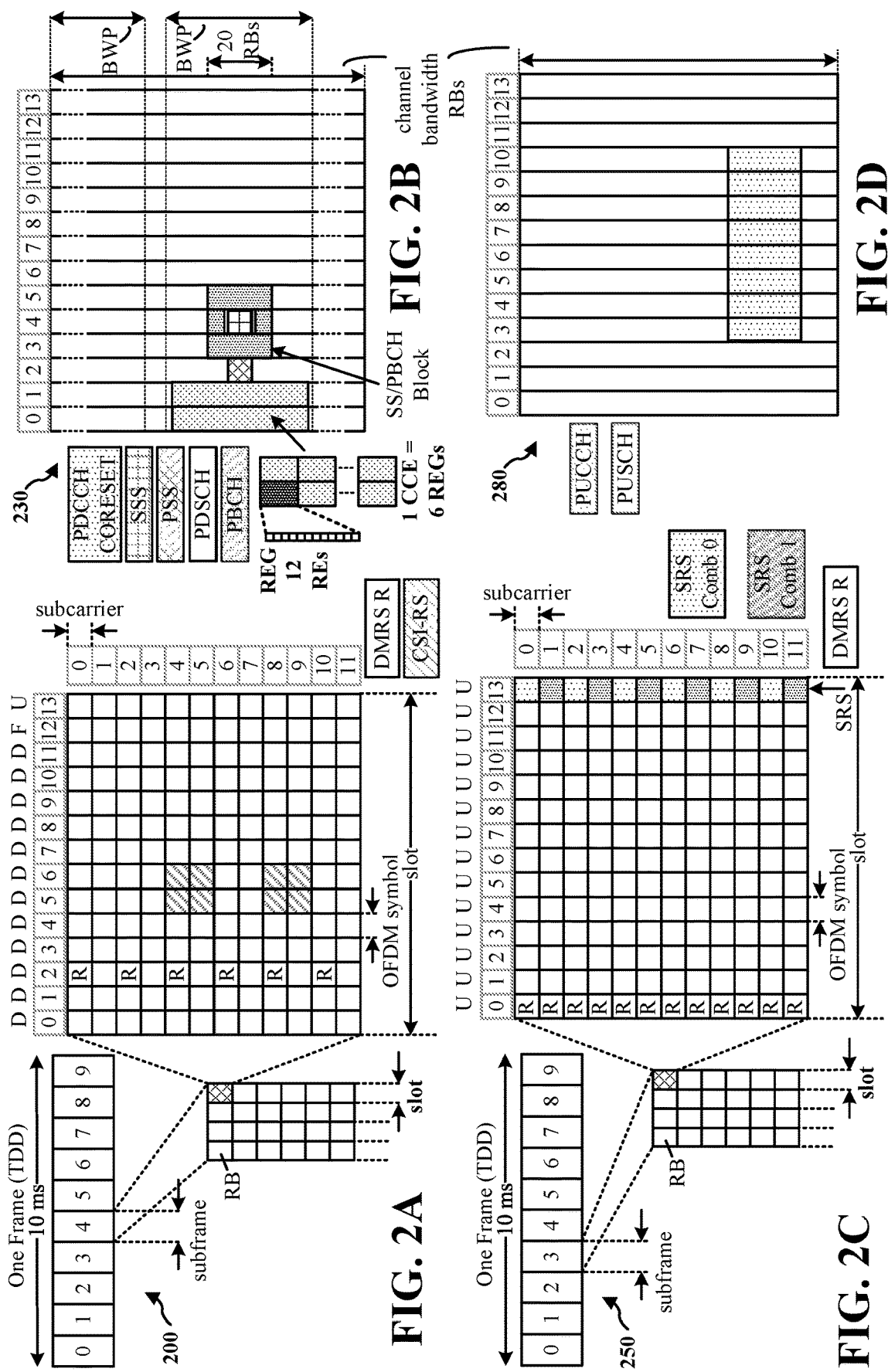
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
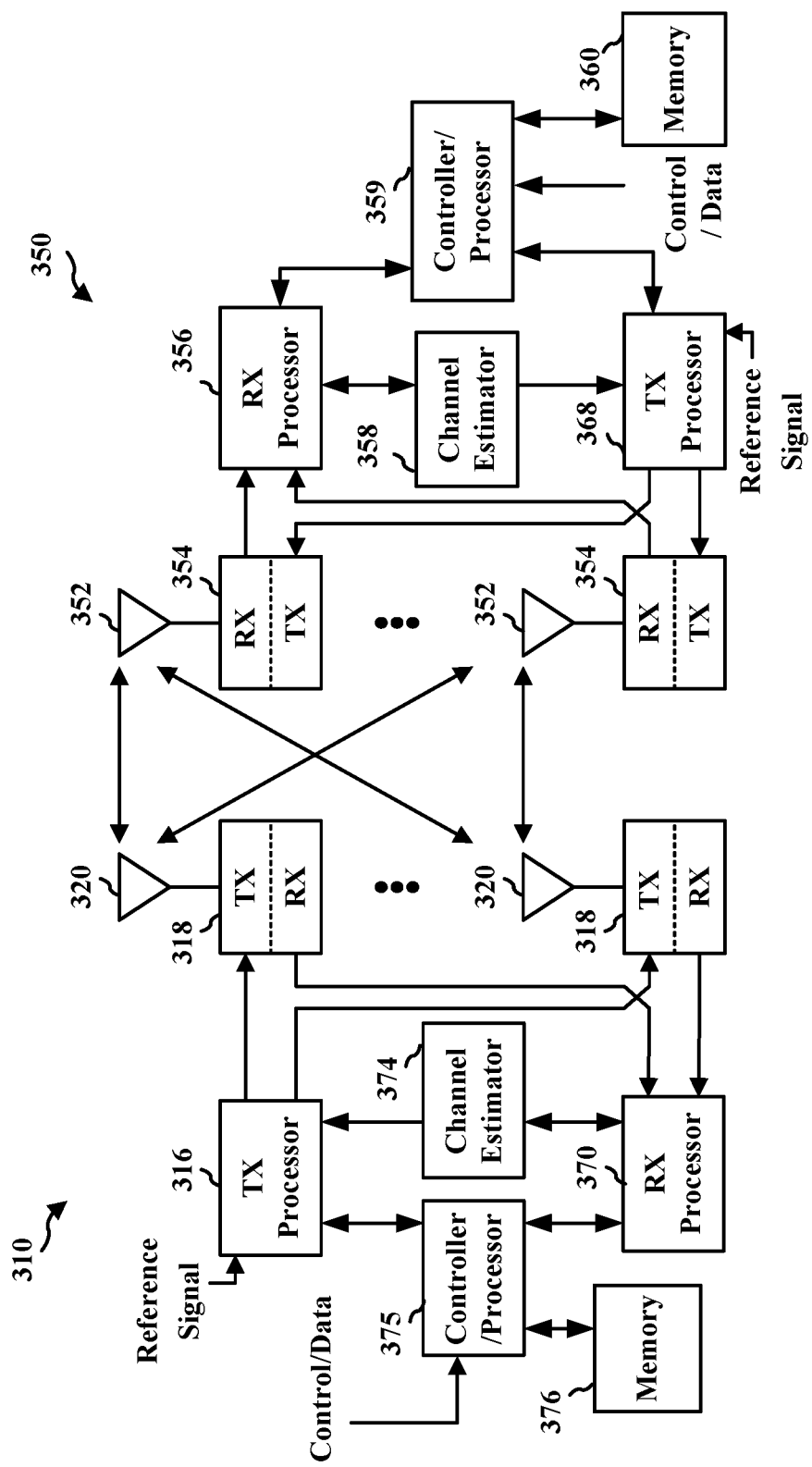
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with DCI component 198 of FIG. 1.

Figure 4:
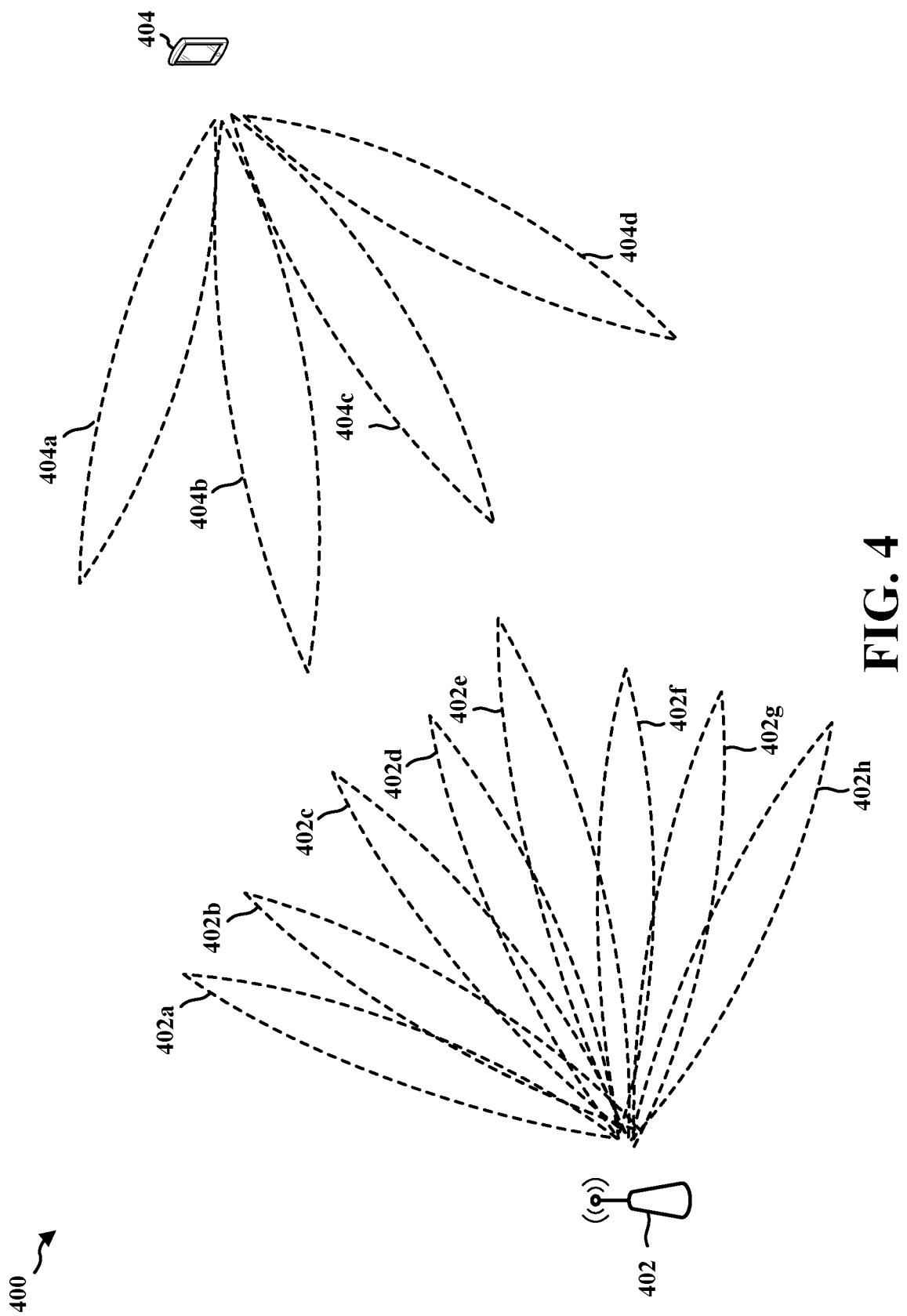
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, such as a DCI for beam updating provided herein, the UE 404 may determine to switch beams, e.g., between beams 402a-402h or may determine that the base station will switch between beams. The beam at the UE 404 may be used for the reception of downlink communication and/or transmission of uplink communication. The beam at the base station 402 may be used for uplink reception and/or downlink transmission. In some examples, the base station 402 may send a transmission that triggers a beam switch by the UE 404. For example, the base station 402 may indicate a TCI state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may improve connection between the UE and the base station by ensuring that the transmitter and receiver use a corresponding configured set of beams for communication and by addressing varying conditions between the base station and the UE and/or movement by the UE or the base station. In some aspects, the base station may transmit DCI, as provided herein, to trigger a TCI state change for the UE.

The UE 404 may operate using carrier aggregation (CA), and may be configured to communicate with the network via a base station 402 utilizing multiple component carriers (CCs). For example, the UE 404 may communicate with the base station 402 using a primary cell (PCell) and a secondary cell (SCell). Carrier aggregation may allow the UE 404 to transmit and/or receive data, simultaneously, on multiple CCs from a single base station 402. Each aggregated carrier may be referred to as a CC. Carrier aggregation may also allow the UE 404 to communicate on one or more concurrent beams. The UE may partition the CCs into different groups under carrier aggregation. For example, CCs in the same group may use the same beam, while CCs in a different group may use different beams or independent beams. For example, a UE supporting three carriers and two beams may group a first and second CC into a group using the first beam and a third CC may use the second beam.

In some wireless communication systems, TCI may include a TCI state that includes at least one source RS to provide a reference e.g., a basis for a UE assumption) to determine a QCL relationship or a spatial filter (e.g., beam) for wireless communication. TCI states may be used by a base station to indicate a beam change to a UE. Various types of TCI states may be used. For example, one TCI state (type 1) may indicate a joint DL or UL common TCI state to indicate a common beam for at least one DL channel or DL RS plus at least one UL channel or UL RS. Another example TCI state (type 2) may indicate a separate DL common TCI state to indicate a common beam for more than one DL channel or DL RS, e.g., and not for an UL channel or UL RS. Yet another example TCI state (type 3) may indicate a separate UL common TCI state to indicate a common beam for more than one UL channel or UL RS, e.g., and not for an UL channel or UL RS. In addition, in some aspects, separate TCI states, one for DL and one for UL, may be utilized. For the separate DL TCI state, the source reference signal(s) in in multiple TCIs (e.g., M TCIs with M being an integer number) provide QCL information at least for UE-dedicated reception on PDSCH and for UE-dedicated reception on all or subset of CORESETs in a CC. For the separate UL TCI state, the source reference signal(s) in N TCIs (e.g., with N being an integer number) may provide a reference for determining common UL TX spatial filter(s) (i.e., beams) at least for dynamic-grant/configured-grant based PUSCH, all or subset of dedicated PUCCH resources in a CC. In addition, the UL TX spatial filter can also apply to all SRS resources in resource set(s) configured for antenna switching/codebook-based/non-codebook-based UL transmissions.

In some wireless communication systems, the base station may transmit DCI to update beam indications under such a TCI framework, e.g., in a unified TCI framework that includes TCI indications for common beams. The DCI may additionally schedule transmissions such as a PDSCH or a PUSCH. Aspects provided herein enable DCI for beam updating that may flexibly schedule or not schedule a transmission. For example, in some aspects, a base station may use DCI formats 1_1 and 1_2 to include UL-only TCI state update beam indications (e.g., for separate UL/DL TCI state indications). In some aspects, other DCI formats, such as newly defined DCI formats, may be used.

Example types of TCI states include types 1, 2, 3, 4, 5, and 6. In addition to the types 1-3 explained above, a type 4 TCI state may include a separate DL single channel/RS TCI state to indicate a beam for a single DL channel/DL RS. The Type 5 TCI state may include a separate UL single channel/RS TCI state to indicate a beam for a single UL channel/UL RS. The Type 6 TCI state may include an UL spatial relation information (SRI) to indicate a beam for a single UL channel/UL RS. Among DCI formats 0_0, 0_1, 0_2, 1_0, 1_1, 1_2, DCI format 1_1 and 1_2 may contain a TCI field that indicates a TCI state, and DCI format 0_1, 0_2 may contain an SRI field for spatial-relation information.

A set of cyclic redundancy check (CRC) bits may be associated with the DCI and may be scrambled with a network temporary identifier (RNTI). For example, the base station may use a DCI with CRC scrambled with a configured scheduling-radio network temporary identifier (RNTI) (CS-RNTI) to schedule resources for semi-persistent scheduling (SPS) PDSCH or configured grant (CG) PUSCH or to activate/release/reactivate SPS PDSCH or CG PUSCH. For example, if a new data indicator (NDI) field of the DCI is set to 0 and if a CRC associated with the DCI is scrambled with CS-RNTI, the UE may determine that the DCI is to activate/release a configuration for SPS PDSCH or CG PUSCH. If the NDI field of the DCI is set to 1 and if a CRC associated with the DCI is scrambled with CS-RNTI, the UE may determine that the DCI schedules retransmission for SPS PDSCH or CG PUSCH. The UE may further confirm that DCI is used to schedule/activate/release SPS PDSCH or CG PUSCH based on a set of one or more fields. For example, if the DCI has CRC scrambled with a corresponding CS-RNTI (which indicates to the UE that the DCI is to schedule a retransmission/activate/release SPS or CG resources) and the NDI field is set to 0 (e.g., indicating an initial transmission), the UE may determine that the DCI is not for a retransmission. An NDI set to "1" is associated with a retransmission. If the fields (which may be referred to as special fields or a subset of fields) such as RV, MCS, FDRA, etc. match reserved values, the UE may determine a purpose of the DCI. If the fields do not match a particular set of values, the UE may discard the DCI. For example, for a single DL SPS or a single UL grant type 2 scheduling activation PDCCH validation when a UE is provided multiple DL SPS or UL grant type 2 configurations, the UE may check to see whether the RV field is set to all zeros for DCI format 0_0/0_1/0_2/1_0/1_2, or 1_1 (e.g., for the enabled TB). For multiple DL SPS and UL grant type 2 scheduling release PDCCH validation, the UE may check to see whether the RV is set to all zeros, the MCS is set to all μs, and the FDRA is set to all 1s for DCI formats 0_0, 0_1, or 0_2. For DCI formats 1_0, 1_1, or 1_2, the UE may check to see whether the RV field is set to all zeros, the MCS field is est to all 1s, the FDRA is set to all 0s for FDRA type 0 or to all is for FDRA type 1. If the fields do not match the indicated values, the DCI does not pass the validation, and the UE may discard the DCI. If more than one SPS configuration is provided to the UE, the HARQ process number field of the DCI may indicate the corresponding ID to be released/activated. When a single SPS configuration is configured for the UE, the HARQ process number field in the DCI may be set to all zeros.

Figure 5A:
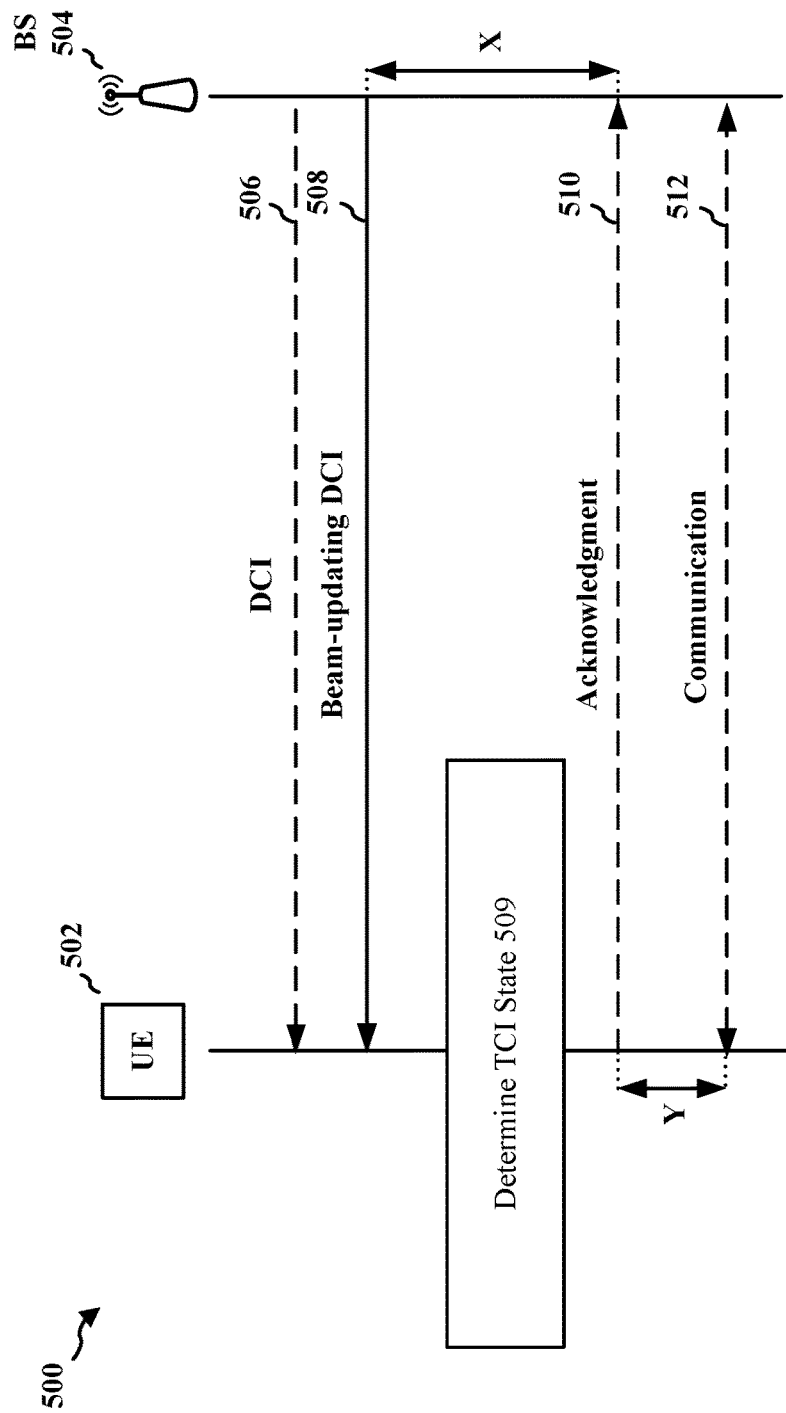
FIG. 5A is a call flow diagram of signaling between a UE and a base station in accordance with certain aspects of the disclosure.

FIG. 5A is a communication flow diagram 500 showing example aspects of signaling between a UE 502 and a base station 504 including indicating TCI states to the UE in DCI from the base station. As illustrated in FIG. 5A, the UE 502 may receive a beam-updating DCI 508 from the base station 504 and may determine a TCI state 509 for one or more of an UL channel, an UL RS, a DL channel, or a DL RS according to the DCI. The beam updating DCI 508 may be one of different DCI formats. In some aspects, the format of the beam updating DCI 508 may be one of DCI formats 0_0, 0_1, 0_2, 1_0, 1_1, 1_2. The beam updating DCI 508 may include a sequence that may indicate a beam updating purpose for the DCI (i.e., beam indication). The CRC associated with the beam updating DCI 508 may be scrambled with a RNTI that is not dedicated for beam updating, such as CS-RNTI, cell-radio RNTI (C-RNTI), or the like. When the sequence is detected by the UE 502, the UE 502 may determine that the beam updating DCI 508 is for beam updating. The beam indication information (e.g., new beam TCI state identifier (ID)), may be conveyed in some other field of the DCI. In some aspects, the beam information may be indicated separately from the indication that the DCI is for a beam update. Thus, the UE may determine the TCI state based on additional information in the DCI. For example, the beam indication information may be included in TCI state ID field in DCI format 1_1, 1_2; in hybrid automatic repeat request (HARQ) process number field in fallback DCI format, or the like.

In some aspects, the sequence may include reserved values in particular fields of the DCI to indicate to the UE the purpose of beam updating. In some aspects, the sequence may include a combination of values in particular fields of the DCI to indicate to the UE the purpose of beam updating. The sequence of values in one or more fields may be a sequence that is not used, or is infeasible, when the DCI is used for other purposes than beam-updating. The UE may use the value of the fields, at least in part, to determine that the DCI is a beam updating DCI. The sequence may indicate to the UE the purpose of beam updating and the base station may not the sequence in DCI for other purposes another purpose such as transmission, activate/release, or the like. In some examples, the sequence may be a defined sequence associated with beam updating or may be a sequence that is not associated with another DCI purpose. In some examples, the sequence in the DCI may not be applicable for purposes other than beam updating DCI.

In some aspects, the CRC associated with the beam updating DCI 508 may be scrambled with CS-RNTI and one or more combinations of validation sequences and special fields (other than the one for SPS PDSCH activation/release) that indicate a beam update purpose for the DCI. In some aspects, the validation sequence(s) and/or fields may be defined for beam updating DCI. In some aspects, CRC associated with the beam updating DCI 508 may be scrambled with C-RNTI and the sequence may be based on one or more of: a redundancy version (RV) field, a frequency domain resource allocation (FDRA) field, a time domain resource allocation (TDRA) field, a hybrid automatic repeat request (HARQ) process number field, or a modulation and coding scheme (MCS) field. As one non-limiting example, the base station may indicate to the UE that the DCI is for a beam update by including a same value in each of the RV field, the FDRA field, the TDRA field, the HARQ process number field, and the MCS field. For example, the UE may determine that a DCI is for a beam update if each of the subset of DCI fields (e.g., the RV field, the FDRA field, the TDRA field, the HARQ process number field, and the MCS field) has a value of 1. The combination of the RV field, the FDRA field, the TDRA field, the HARQ process number field, and the MCS field are to illustrate the concept. In other aspects, the subset of fields may include a different subset of DCI fields.

Figure 5B:
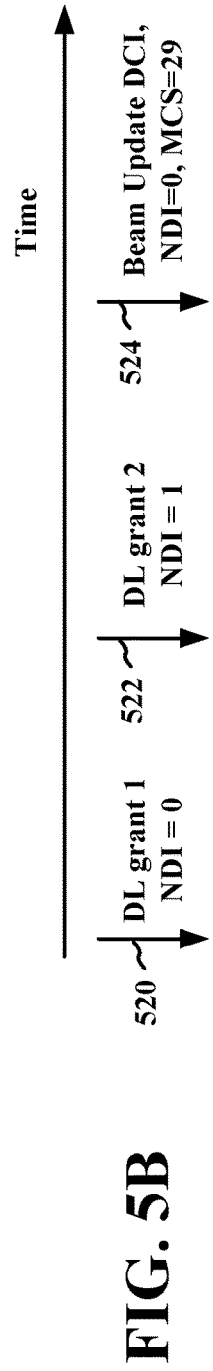
FIG. 5B illustrates examples of DCI having different purposes.

In some aspects, the base station may indicate that the DCI is a beam updating DCI 508 by scrambling the CRC associated with the beam updating DCI 508 with C-RNTI and including any combination of an NDI field to indicate a new transmission, an MCS field to indicate a reserved MCS value for retransmission, and a sequence in additional, particular fields, e.g. all '1' or '0' in HARQ ID, RV field and FDRA. The UE may use one or more of the indications to determine that the DCI is a beam updating DCI. In such aspects, the sequence may not be a sequence that is used for scheduling retransmission. Thus, by indicating parameters that are not typically associated, such as an MCS for retransmission and an NDI for a new transmission, or an MCS for retransmission and a sequence that is not for retransmission, the base station may indicate to the UE that the DCI is for a beam update, e.g., rather than a retransmission or an initial transmission. The sequence may be a sequence that is not used for scheduling retransmissions. The sequence may be unique to indicating that the DCI is for a beam update. Having a particular sequence may help the UE to avoid mistaking another purpose for the DCI. FIG. 5B illustrates an example of various types of DCI. A first DCI 520 includes a DL grant for an initial transmission (e.g., having NDI=0 for an initial transmission). A second DCI 522 includes a DL grant for a retransmission (e.g., having NDI=1 for a retransmission). A beam update DCI 524 includes beam update information. The beam update DCI may include an NDI field for an initial transmission and an MCS associated with a retransmission as a way of indicating to the UE that the DCI is for a beam update rather than a DL grant. Without a sequence validation, if the DL grant for a retransmission (e.g., DCI 522) is missed by the UE, the UE may mistake the beam update DCI 524 for a DL grant for the retransmission. In some examples, the sequence may be one that is not used for retransmission DCI so that the UE can distinguish between DCI 522 with a DL grant for the retransmission and the beam update DCI 524. Thus, the UE may determine that the DCI is a beam scheduling DCI based, at least in part, on the sequence. The base station may indicate different DCI formats to indicate beam updates for particular types of TCI states. Thus, the UE may determine that the DCI is a beam scheduling DCI based on the sequence and may determine the type of TCI state being indicated in the DCI based on the DCI format. For example, DL DCI format may be used to indicate a TCI state for a DL channel. In some aspects, the beam update DCI, e.g., may provide the beam update without scheduling a transmission.

In some aspects, such a beam updating DCI 508 of DCI formats 0_0, 0_1, 0_2, 1_0, 1_1, or 1_2 may include a sequence that indicates the beam updating purpose of the DCI (e.g., DCI for beam indication) and with the DCI may have CRC scrambled with a RNTI that is not dedicated for beam updating, such as CS-RNTI, C-RNTI or the like, and the DCI may not schedule a transmission (such as a communication 512).

In some aspects, the CRC associated with the beam updating DCI 508 may be scrambled with a type of RNTI that is dedicated for a beam-updating DCI. The UE receiving the DCI may determine that the DCI is a beam updating DCI based, at least in part, on the RNTI used to scramble the CRC. In some aspects, the RNTI may be referred to as a beam-updating RNTI (BU-RNTI). In other aspects, the RNTI may be referred to by another name. In some aspects, the beam updating DCI 508 may be of DCI format 0_0, 0_1, 0_2, 1_0, 1_1, or 1_2. In some aspects, the BU-RNTI may include common a RNTI for all type of TCIs that may be updated by the DCI, and a field inside the beam updating DCI 508 may be used to indicate the particular TCI type that is being updated by the beam updating DCI 508. In some aspects, the BU-RNTI may include a dedicated RNTI for a particular type of TCI state, e.g., with each type of TCI state update being associated with a different, dedicated RNTI. In some aspects, some fields of the DCI may be reused to indicate information related to the TCI update. For example, a HARQ ID field (in the beam updating DCI 508) may indicate the TCI state ID in fallback DCI. As another example, the TCI state ID field in DCI format 1_1 or DCI format 1_2 in the beam updating DCI 508 may indicate the new TCI state ID. In some aspects, after receiving a DCI having CRC scrambled with the BU-RNTI, the UE 502 may verify whether the DCI is a beam updating DCI by checking if one or more fields using a reserved index for beam updating. If the one or more fields do not include an index associated with beam updating, the UE 502 may discard the DCI. In some examples, the BU-RNTI may be used to indicate that an existing DCI format is used to indicate a beam update, e.g., without using a DCI format that is dedicated to beam updates.

In some aspects, the beam updating DCI 508 with CRC scrambled with the BU-RNTI may indicate a beam update without scheduling a transmission. For example, the DCI may be based on a fallback DCI format that does not include a TCI field.

In some aspects, when the base station updates the beam of a channel or RS that is different than a scheduled channel/RS, the target channel/RS (e.g., associated with the beam change/TCI state update) and the scheduled channel/RS may not share a common TCI state. For example, the base station may send DCI to schedule PDSCH and to change a PUSCH beam where there is not a common TCI configured for both the DL channel (e.g., PDSCH) and the UL channel (e.g., PUSCH).

In some aspects, such beam updating DCI 508 with CRC scrambled with the BU-RNTI may be used for scheduling a transmission, such as the communication 512. For example, when the beam updating DCI 508 is of a DCI format with TCI ID field (e.g. DCI format 1_1 or DCI format 1_2), and if 1) the scheduled channel/RS and target channel/RS of a beam update are the same channel or 2) the beam of the scheduled channel/RS and the updated beam is defined in some common TCI state, the beam updating DCI 508 may be used for beam-updating and simultaneously schedule the communication 512. In another example, if the UL beam0 and DL beam1 is defined in common TCI state 0, the beam updating DCI 508 of format 1_1 schedules a PDSCH using C-RNTI and indicating common TCI state 0, then PDSCH beam may be updated to DL beam1. If the beam updating DCI 508 of DCI format 1_1 schedules a PDSCH using BU-RNTI and indicating common TCI state 0, then both PDSCH and PUSCH beam are updated to UL beam0 ad DL beam1.

In some aspects, the beam-updating DCI 508 may be based on an existing DCI format and may include a field for indicating the beam update purpose of the DCI. For example, the base station may use a new field in connection with an existing DCI to indicate a beam update. The DCI format may include one or more additional fields for indicating a TCI state update, e.g., in DCI format 0_0, DCI format 0_1, DCI format 0_2, DCI format 1_0, DCI format 1_1, or DCI format 1_2. The one or more fields may include a TCI state field to indicate an updated beam. In some aspects, the payload of the DCI format may be dynamically configured by the base station. In some aspects, the base station may configure a size of the DCI format via radio resource control (RRC). For example, when a higher layer indicates that the DCI based beam update is allowed and a TCI pool is configured, the field may contain X bits, where X may equal the size of TCI pool. If the DCI based beam update is not allowed, or no TCI pool has been configured at UE, then the field may have zero bits. In some aspects, the base station may use a reserved bit in the field or a reserved index to indicate when there is no beam update. In some aspects, such beam-updating DCI 508 of a DCI format with one or more fields for indicating TCI state may be added in any of DCI formats 0_0, 0_1, 0_2, 1_0, 1_1, or 1_2 for scheduling a transmission, such as the communication 512. In some aspects, the base station may indicate a beam update and schedule a transmission in the DCI based on a rule that indicates whether such transmission is allowed. In some aspects, the base station may indicate a beam update and schedule a transmission in the DCI based on signaling that indicates whether the combined beam update/transmission scheduling is allowed or supported. If allowed, supported, or enabled, an indication in the beam-updating DCI 508 may indicate whether the beam-updating DCI 508 is also used for scheduling a transmission in addition to the beam update. For example, one or more additional bits or a particular field set may be used for the indication. In some aspects, the bits or the field may be to a reserved index when the DCI does not include a scheduling grant.

In some aspects, the base station 504 may transmit a first stage DCI 506 prior to transmitting the beam-updating DCI 508. The first stage DCI 506 may be of one of DCI formats 0_0, 0_1, 0_2, 1_0, 1_1, or 1_2. The first stage DCI may schedule a second stage message (such as the beam-updating DCI 508) which contains the beam indication information. The first stage DCI may use a reserved bit, a sequence in some fields or a new/reserved field to indicate that the second stage message is for a beam indication or beam update. In some aspects, the second stage message may be a medium access control (MAC) control element (CE) (MAC-CE) instead of a second DCI. In some aspects, the PDSCH carrying the MAC-CE may be scheduled by the first stage DCI 506 or using a configured resource. In some aspects, the second stage message may be carried by a PDSCH (e.g., scheduled by the first stage DCI 506) or PDCCH. In some aspects, the PDSCH or PDCCH may be transmitted via a resource identified based on a rule, such as a defined number of slots after the first stage DCI 506. In some aspects, the PDSCH or the PDCCH may be transmitted in a configured resources, e.g., a configured number of slots after the first stage DCI.

In some aspects, the beam-updating DCI 508 may use a different DCI format than one of DCI formats 0_0, 0_1, 0_2, 1_0, 1_1, or 1_2. In such aspects, the beam-updating DCI 508 may be of a format used for updating TCI indication, e.g., dedicated for updating a TCI state, e.g., beam updating. The base station may indicate the updated TCI ID, applicable channel/RS for the beam update in the beam-updating DCI 508. In some aspects, the beam-updating DCI 508 may indicate a CC, a bandwidth part (BWP), or a CC group for the beam update. If the CC indication is not present, the UE 502 may use an implicit rule to determine the applicable CC, e.g. the CC of receiving the DCI. In such aspects, the beam-updating DCI 508 may be of a format also used for updating TCI state content. In some aspects, one or more search spaces (SS) may be configured for the UE 502. In such aspects where the beam-updating DCI 508 may be of a format used for updating TCI indication, the beam-updating DCI 508 may be used for scheduling a transmission (e.g., communication 512) at the same time.

In some aspects, when the beam updating DCI 508 also schedules a DL or UL transmission (e.g., the communication 512), then the acknowledgment (ACK) for the DL transmission or the UL transmission may be considered as ACK to the DCI and a dedicated ACK 510 for the beam update DCI may not be needed, e.g., the UE may not transmit a dedicated ACK for the beam update DCI. In some aspects where the beam updating DCI 508 does not schedule the communication 512, the UE may transmit a dedicated ACK 510 for the beam update DCI. In some aspects, the UE may transmit the ACK 510 in uplink control information (UCI), either in PUSCH or PUCCH. In some aspects, the UE may transmit the ACK 510 a period X after receiving last PDCCH symbol containing the beam updating DCI 508. In some aspects, the time period X may be determined by tone spacing of the CC receiving DCI and that of the CC to apply the beam indication and may also be determined based on a UE capability of the UE 502. In some aspects, the application of the new beam indicated in the DCI may take place a period time of Y after the UE sends (a last symbol of) the ACK 510 to the beam update indication. The period of time Y may be based on UE capability of the UE 502. In some aspects, Y may be also based on the tone spacing of at least one of the CC sending ACK, the CC receiving ACK, or the CC to apply beam update. If beam update takes place in multiple CCs, then one of the CCs, e.g. the one with smallest tone spacing, may be used to determine X and/or Y.

Figure 6:
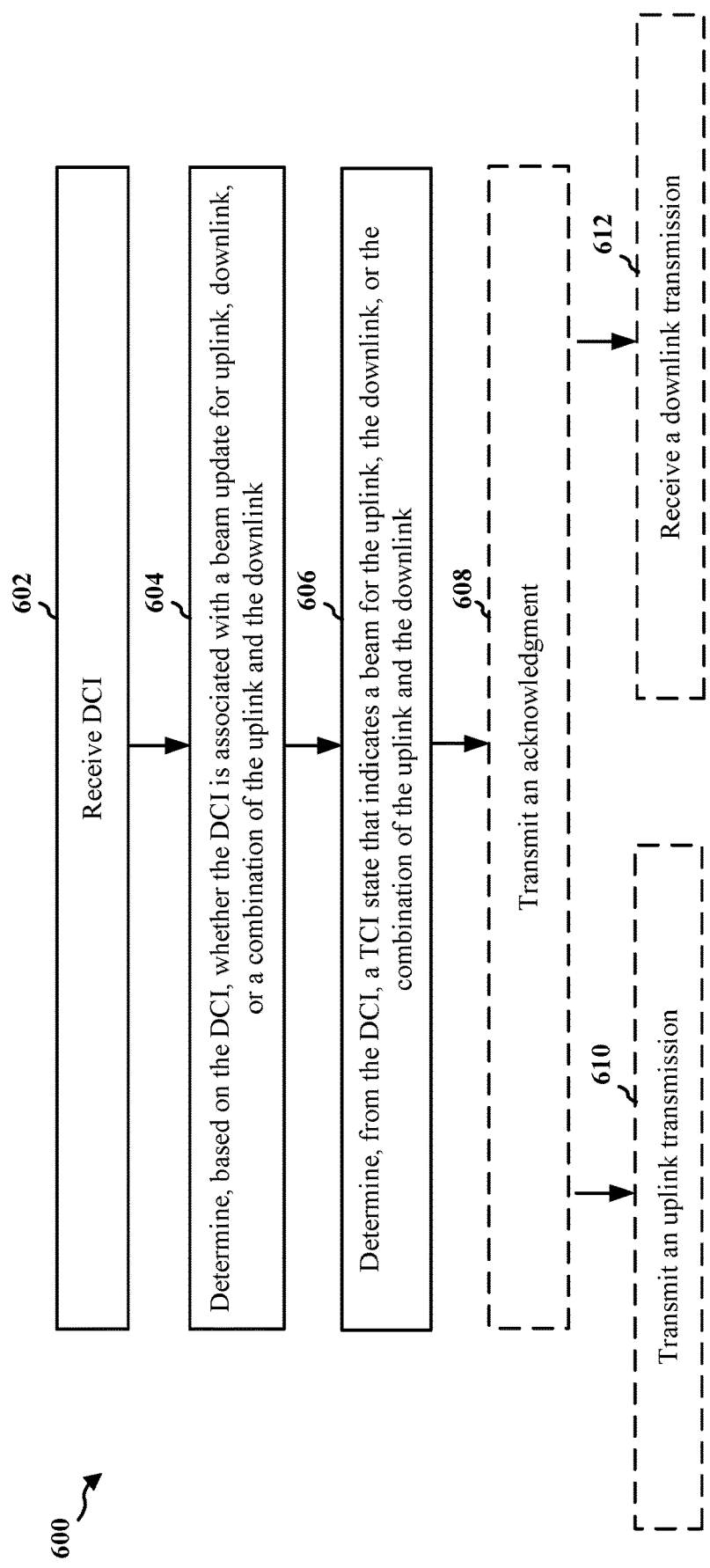
FIG. 6 is a flowchart of a method of wireless communication.

FIG. 6 is a flowchart 600 of a method of wireless communication. The method may be performed by a UE (e.g., the UE 104, the UE 404, the UE 502; the apparatus 802). Optional steps are illustrated in dashed lines. The steps are not necessarily illustrated in chronological order. The method may enable DCI that indicates a TCI state update for one of various types of TCI state updates.

At 602, the UE receives DCI. In some aspects, 602 may be performed by DCI reception component 842 in FIG. 8. FIG. 5A illustrates an example of a UE 502 receiving DCI 508 from a base station 504. In some aspects, the DCI further comprises beam indication information comprising a TCI state ID of the TCI state that indicates the beam. In some aspects, the DCI comprises a HARQ ID field indicating a TCI state ID of the TCI state that indicates the beam. In some aspects, the DCI comprises a TCI state ID field indicating the TCI state that indicates the beam. In some aspects, the DCI is used for scheduling the beam when: a channel for the beam update, a reference signal and target channel, and a scheduled channel are a same channel or a beam for the scheduled channel and a beam for the beam update are defined in a common TCI state. In some aspects, the DCI comprises a dedicated field indicating that the beam update is for the uplink, the downlink, or the combination of the uplink and the downlink. In some aspects, a payload of the DCI is configured via RRC signaling. In some aspects, the DCI schedules an uplink transmission or a downlink transmission. In some aspects, the DCI is of a format used for beam update. In some aspects, a dedicated SS is configured at the UE for monitoring the DCI. In some aspects, the DCI does not schedule a transmission.

At 604, the UE may determine, based on the DCI, whether the DCI is associated with a beam update for uplink, downlink, or a combination of the uplink and the downlink. In some aspects, 604 may be performed by DCI determining component 844 in FIG. 8. The determination may include any of the aspects described in connection with the determination, at 509, in FIG. 5A. In some aspects, the DCI comprises a sequence associated with the beam update and the UE uses the sequence to determine whether the beam update is for the uplink, the downlink, or the combination of the uplink and the downlink. In some aspects, the sequence is different from a sequence used for scheduling a transmission. In some aspects, a CRC associated with the DCI is scrambled with a CS-RNTI and the sequence is different from a sequence used for SPS PDSCH activation or release. In some aspects, a CRC associated with the DCI is scrambled with a C-RNTI, and wherein the sequence is a combination of one or more of: a RV field, a FDRA field, a TDRA field, a HARQ process number field, or a MCS field. In some aspects, a CRC associated with the DCI is scrambled with a BU-RNTI dedicated for beam updating and the UE determines that the DCI indicates the beam update for the uplink, the downlink, or the combination of the uplink and the downlink based on the BU-RNTI. In some aspects, prior to determining that the DCI is associated with a beam update, the UE receives a second stage message including a second DCI or a MAC-CE in a PDCCH or a PDSCH scheduled by the DCI.

At 606, the UE may determine, from the DCI, a TCI state that indicates a beam for the uplink, the downlink, or the combination of the uplink and the downlink. In some aspects, 606 may be performed by TCI state determining component 846 in FIG. 8.

At 608, the UE may transmit an acknowledgment. In some aspects, 608 may be performed by ACK component 848 in FIG. 8. The determination may include any of the aspects described in connection with the determination, at 509, in FIG. 5A. In some aspects, the UE transmits a non-dedicated acknowledgment, such as a uplink transmission or an acknowledgment of a downlink transmission, acknowledging reception of the DCI when the DCI schedules a downlink transmission or an uplink transmission. In some aspects, the UE transmits a dedicated acknowledgment acknowledging reception of the DCI when the DCI does not schedule a downlink transmission or an uplink transmission. In some aspects, the UE may transmit UCI acknowledging reception of the DCI. In some aspects, the UE receives a new beam indication after a period of time after transmitting the acknowledgment. In some aspects, the period of time is determined based on a set of UE capability metrics of the UE. In some aspects, the period of time is determined based on a tone spacing of a CC receiving the DCI and a tone spacing of a CC transmitting the acknowledgment.

At 610, the UE may transmit an uplink transmission. In some aspects, 610 may be performed by uplink component 850 in FIG. 8. In some aspects, the UE determines that the beam update is for the uplink and the UE may transmit an uplink transmission using the beam based on the TCI state. In some aspects, the TCI state indicates at least two uplink channels. In some aspects, the UE determines that the beam update is for the uplink and the downlink and the UE may transmit an uplink transmission and receive a downlink transmission based on the beam update.

At 612, the UE may receive a downlink transmission. In some aspects, 612 may be performed by downlink component 852 in FIG. 8. In some aspects, the UE determines that the beam update is for the downlink transmission and the UE may receive a downlink transmission using the beam based on the TCI state. In some aspects, the TCI state indicates at least two downlink channels.

Figure 7:
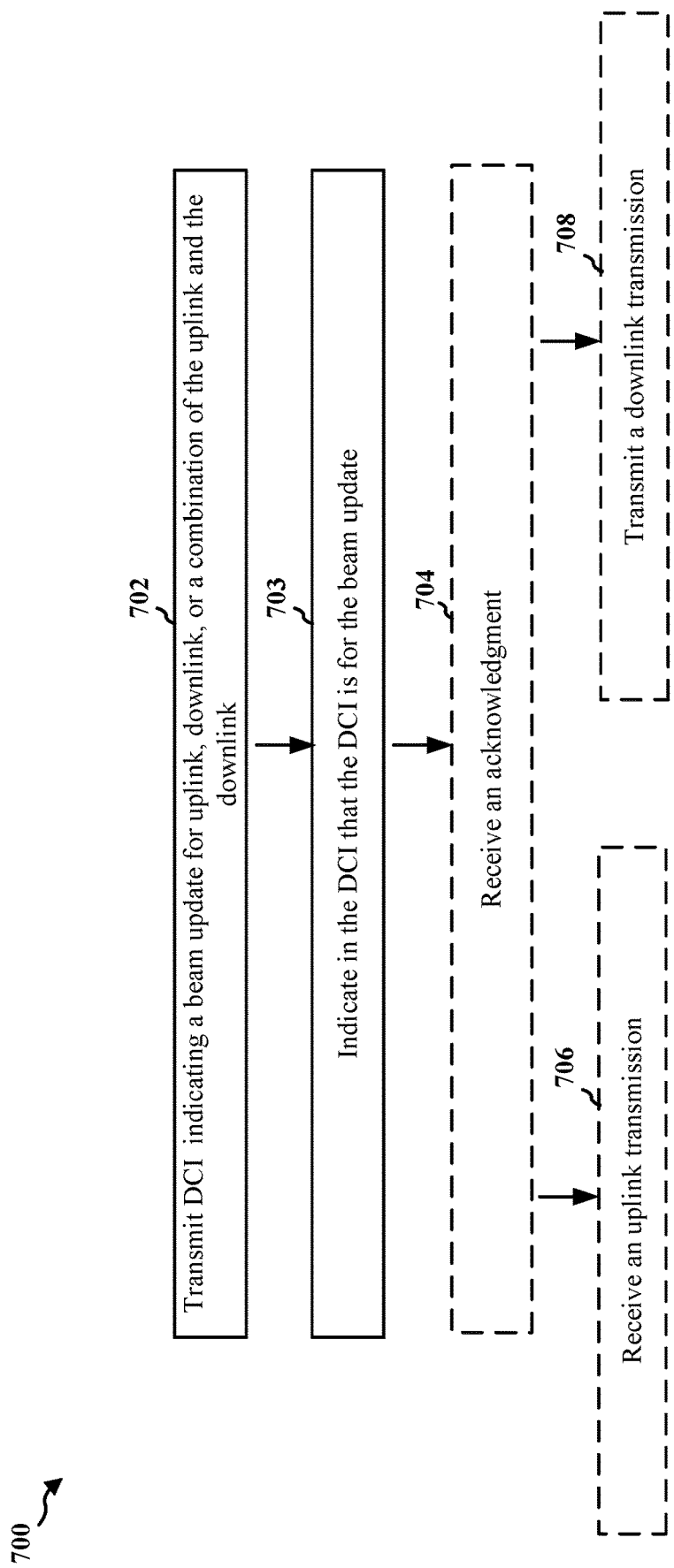
FIG. 7 is a flowchart of a method of wireless communication.

FIG. 7 is a flowchart 700 of a method of wireless communication. The method may be performed by a base station (e.g., the base station 102/180, the base station 402, the base station 504; the apparatus 902). Optional steps are illustrated in dashed lines. The steps are not necessarily illustrated in chronological order. The method may enable the base station to transmit DCI to a UE that indicates a TCI state update for one of various types of TCI state updates.

At 702, the base station may transmit DCI indicating a beam update for uplink, downlink, or a combination of the uplink and the downlink. In some aspects, 602 may be performed by DCI component 942 in FIG. 9. FIG. 5A illustrates an example of a base station 504 transmitting a beam updating DCI 508 to a UE 502. In some aspects, the DCI further comprises beam indication information comprising a TCI state ID of the TCI state that indicates the beam. In some aspects, the DCI comprises a HARQ ID field indicating a TCI state ID of the TCI state that indicates the beam. In some aspects, the DCI comprises a TCI state ID field indicating the TCI state that indicates the beam.

At 703, the base station indicates in the DCI that the DCI is for the beam update. The indication may be performed by the DCI component 942 in FIG. 9. The indication may be based on any of the aspects described in connection with the beam updating DCI 508 in FIG. 5A. In some aspects, the DCI is used for scheduling the beam when: a channel for the beam update, a reference signal and target channel, and a scheduled channel are a same channel or a beam for the scheduled channel and a beam for the beam update are defined in a common TCI state. In some aspects, the DCI comprises a dedicated field indicating that the beam update is for the uplink, the downlink, or the combination of the uplink and the downlink. In some aspects, a payload of the DCI is configured via RRC signaling. In some aspects, the DCI schedules an uplink transmission or a downlink transmission. In some aspects, the DCI is of a format used for beam update. In some aspects, a dedicated SS is configured at the UE for monitoring the DCI. In some aspects, the DCI does not schedule a transmission. In some aspects, the DCI comprises a sequence associated with the beam update and the UE uses the sequence to determine whether the beam update is for the uplink, the downlink, or the combination of the uplink and the downlink. In some aspects, the sequence is different from a sequence used for scheduling a transmission. In some aspects, a CRC associated with the DCI is scrambled with a CS-RNTI and the sequence is different from a sequence used for SPS PDSCH activation or release. In some aspects, a CRC associated with the DCI is scrambled with a C-RNTI, and wherein the sequence is a combination of one or more of: a RV field, a FDRA field, a TDRA field, a HARQ process number field, or a MCS field. In some aspects, a CRC associated with the DCI is scrambled with a BU-RNTI dedicated for beam updating and the UE determines that the DCI indicates the beam update for the uplink, the downlink, or the combination of the uplink and the downlink based on the BU-RNTI. In some aspects, prior to determining that the DCI is associated with a beam update, the UE receives a second stage message including a second DCI or a MAC-CE in a PDCCH or a PDSCH scheduled by the DCI.

At 704, the base station may receive an acknowledgment. In some aspects, 608 may be performed by ACK processing component 944 in FIG. 9. In some aspects, the base station receives a non-dedicated acknowledgment, such as a uplink transmission or an acknowledgment of a downlink transmission, that may serve as acknowledging reception of the DCI when the DCI schedules a downlink transmission or an uplink transmission without receiving a dedicated acknowledgment. In some aspects, the base station receives a dedicated acknowledgment acknowledging reception of the DCI when the DCI does not schedule a downlink transmission or an uplink transmission. In some aspects, the acknowledgment may be in the form of a UCI. In some aspects, the base station transmits a new beam indication after a period of time after receiving the acknowledgment. In some aspects, the period of time is determined based on a set of UE capability metrics of the UE. In some aspects, the period of time is determined based on a tone spacing of a CC receiving the DCI and a tone spacing of a CC transmitting the acknowledgment.

At 706, the base station may receive an uplink transmission. In some aspects, 610 may be performed by uplink component 946 in FIG. 9. In some aspects, the TCI state indicates at least two uplink channels. In some aspects, the beam update is for the uplink and the downlink.

At 708, the base station may transmit a downlink transmission. In some aspects, 708 may be performed by downlink component 948 in FIG. 9. In some aspects, the UE determines that the beam update is for the downlink transmission and the UE may receive a downlink transmission using the beam based on the TCI state. In some aspects, the TCI state indicates at least two downlink channels.

Figure 8:
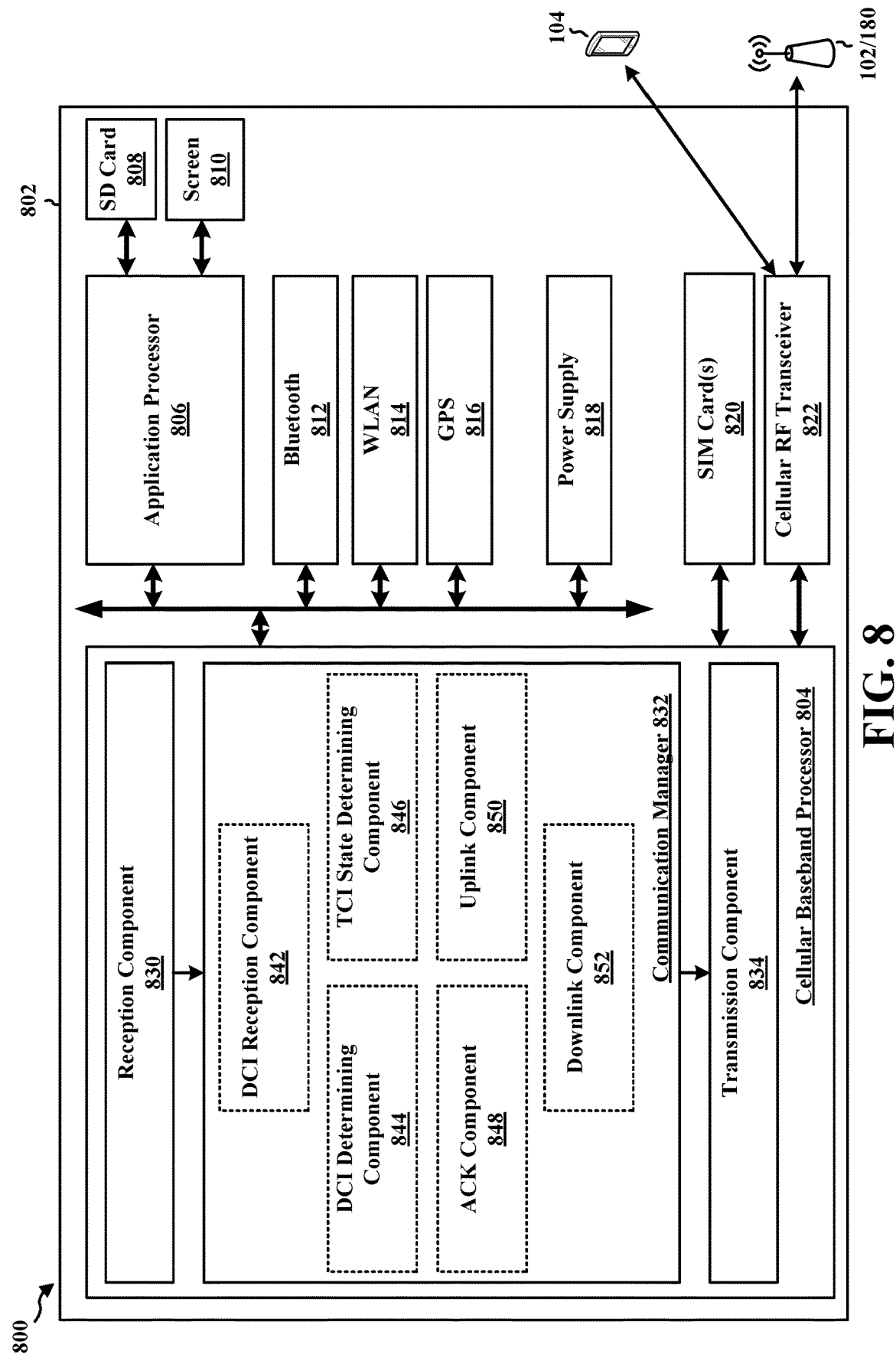
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the afore discussed additional modules of the apparatus 802.

The communication manager 832 includes a DCI reception component 842 that is configured to receive DCI, e.g., as described in connection with 602 in FIG. 6. The communication manager 832 may further include a DCI determining component 844 that is configured to determine, based on the DCI, whether the DCI is associated with a beam update for uplink, downlink, or a combination of the uplink and the downlink, e.g., as described in connection with 604 in FIG. 6. The communication manager 832 may further include a TCI state determining component 846 that is configured to determine, from the DCI, a TCI state that indicates a beam for the uplink, the downlink, or the combination of the uplink and the downlink, e.g., as described in connection with 606 in FIG. 6. The communication manager 832 may further include an ACK component 848 that is configured to transmit an acknowledgment, e.g., as described in connection with 608 in FIG. 6. The communication manager 832 may further include an uplink component 850 that is configured to transmit an uplink transmission, e.g., as described in connection with 610 in FIG. 6. The communication manager 832 may further include a downlink component 852 that is configured to receive a downlink transmission, e.g., as described in connection with 612 in FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving DCI. The cellular baseband processor 804 may further include means for determining, based on the DCI, whether the DCI is associated with a beam update for uplink, downlink, or a combination of the uplink and the downlink. The cellular baseband processor 804 may further include means for determining, from the DCI, a TCI state that indicates a beam for the uplink, the downlink, or the combination of the uplink and the downlink. The cellular baseband processor 804 may further include means for transmitting an uplink transmission using the beam based on the TCI state. The cellular baseband processor 804 may further include means for receiving a downlink transmission using the beam based on the TCI state. The cellular baseband processor 804 may further include means for transmitting an uplink transmission based on the beam update. The cellular baseband processor 804 may further include means for receiving a downlink transmission based on the beam update. The cellular baseband processor 804 may further include means for receiving a second stage message including a second DCI or a MAC-CE in a PDCCH or a PDSCH scheduled by the DCI prior to determining that the DCI is associated with a beam update. The cellular baseband processor 804 may further include means for transmitting an UCI acknowledging reception of the DCI, wherein the DCI schedules a downlink transmission or an uplink transmission. The cellular baseband processor 804 may further include means for transmitting a dedicated acknowledgment acknowledging reception of the DCI. The cellular baseband processor 804 may further include means for receiving a new beam indication after a period of time after transmitting the acknowledgment.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a DCI component 942 that receives DCI, e.g., as described in connection with 702 in FIG. 7. The communication manager 932 further includes a ACK processing component 944 that receives an acknowledgment, e.g., as described in connection with 704 in FIG. 7. The communication manager 932 further includes a uplink component 946 that receives an uplink transmission, e.g., as described in connection with 706 in FIG. 7. The communication manager 932 further includes a downlink component 948 that transmits a downlink transmission, e.g., as described in connection with 708 in FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting DCI. The baseband unit 904 may further include means for transmitting a downlink transmission using the beam based on the TCI state. The baseband unit 904 may further include means for receiving an uplink transmission. The baseband unit 904 may further include means for transmitting a downlink transmission. The baseband unit 904 may further include means for transmitting a second stage message including a second DCI or a MAC-CE in a PDCCH or a PDSCH scheduled by the DCI. The baseband unit 904 may further include means for receiving an UCI acknowledging reception of the DCI, wherein the DCI schedules a downlink transmission or an uplink transmission. The baseband unit 904 may further include means for receiving a dedicated acknowledgment acknowledging reception of the DCI. The baseband unit 904 may further include means for transmitting a new beam indication after a period of time after receiving the acknowledgment.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving DCI; determining, based on the DCI, whether the DCI is associated with a beam update for uplink, downlink, or a combination of the uplink and the downlink; and determining, from the DCI, a TCI state that indicates a beam for the uplink, the downlink, or the combination of the uplink and the downlink.

Aspect 2 is the method of aspect 1, wherein the UE determines that the beam update is for the uplink, the method further comprising: transmitting an uplink transmission using the beam based on the TCI state.

Aspect 3 is the method of any of aspects 1-2, wherein the TCI state indicates at least two uplink channels.

Aspect 4 is the method of any of aspects 1-3, wherein the UE determines that the beam update is for the downlink transmission, the method further comprising: receiving a downlink transmission using the beam based on the TCI state.

Aspect 5 is the method of any of aspects 1-4, wherein the TCI state indicates at least two downlink channels.

Aspect 6 is the method of any of aspects 1-5, wherein the UE determines that the beam update is for the uplink and the downlink, the method further comprising: transmitting an uplink transmission based on the beam update; and receiving a downlink transmission based on the beam update.

Aspect 7 is the method of any of aspects 1-6, wherein the DCI comprises a sequence associated with the beam update, and the UE uses the sequence to determine whether the beam update is for the uplink, the downlink, or the combination of the uplink and the downlink.

Aspect 8 is the method of any of aspects 1-7, wherein the DCI further comprises beam indication information comprising a TCI state ID of the TCI state that indicates the beam.

Aspect 9 is the method of any of aspects 1-8, wherein the sequence is different from a sequence used for scheduling a transmission.

Aspect 10 is the method of any of aspects 1-9, wherein a CRC associated with the DCI is scrambled with a CS-RNTI, and wherein the sequence is different from a sequence used for SPS PDSCH activation or release.

Aspect 11 is the method of any of aspects 1-9, wherein a CRC associated with the DCI is scrambled with a C-RNTI, and wherein the sequence is a combination of one or more of: a RV field, a FDRA field, a TDRA field, a HARQ process number field, or a MCS field.

Aspect 12 is the method of any of aspects 1-9, wherein a CRC associated with the DCI is scrambled with a C-RNTI, and wherein the sequence is a combination of one or more of: a RV field, a NDI field, a FDRA field, a HARQ process number field, or a MCS field.

Aspect 13 is the method of any of aspects 1-12, wherein the DCI does not schedule a transmission.

Aspect 14 is the method of any of aspects 1-9, wherein a CRC associated with the DCI is scrambled with a BU-RNTI dedicated for beam updating and the UE determines that the DCI indicates the beam update for the uplink, the downlink, or the combination of the uplink and the downlink based on the BU-RNTI.

Aspect 15 is the method of any of aspects 1-14, wherein the DCI comprises a HARQ ID field indicating a TCI state ID of the TCI state that indicates the beam.

Aspect 16 is the method of any of aspects 1-15, wherein the DCI comprises a TCI state ID field indicating the TCI state that indicates the beam, and wherein the DCI is used for scheduling the beam when: a channel for the beam update, a reference signal and target channel, and a scheduled channel are a same channel; or a beam for the scheduled channel and a beam for the beam update are defined in a common TCI state.

Aspect 17 is the method of any of aspects 1-16, wherein the DCI comprises a dedicated field indicating that the beam update is for the uplink, the downlink, or the combination of the uplink and the downlink.

Aspect 18 is the method of any of aspects 1-17, wherein a payload of the DCI is configured via RRC signaling.

Aspect 19 is the method of any of aspects 1-8 and 16-18, wherein the DCI schedules an uplink transmission or a downlink transmission.

Aspect 20 is the method of any of aspects 1-19, further comprising: prior to determining that the DCI is associated with a beam update, receiving a second stage message including a second DCI or a medium access control MAC-CE in a PDCCH or a PDSCH scheduled by the DCI.

Aspect 21 is the method of any of aspects 1-20, wherein the DCI is of a format used for beam update.

Aspect 22 is the method of any of aspects 1-21, wherein a dedicated SS is configured at the UE for monitoring the DCI.

Aspect 23 is the method of any of aspects 1-22, further comprising transmitting a non-dedicated acknowledgment in acknowledging reception of the DCI, wherein the DCI schedules a downlink transmission or an uplink transmission.

Aspect 24 is the method of any of aspects 1-23, further comprising transmitting a dedicated acknowledgment acknowledging reception of the DCI, wherein the DCI does not schedule a downlink transmission or an uplink transmission.

Aspect 25 is the method of any of aspects 1-24, further comprising receiving a new beam indication after a period of time after transmitting the acknowledgment.

Aspect 26 is the method of any of aspects 1-25, wherein the period of time is determined based on a set of UE capability metrics of the UE.

Aspect 27 is the method of any of aspects 1-26, wherein the period of time is determined based on a tone spacing of a CC receiving the DCI and a tone spacing of a CC transmitting the acknowledgment.

Aspect 28 is a method of wireless communication at a base station comprising: transmitting DCI indicating a beam update for uplink, downlink, or a combination of the uplink and the downlink; and indicating in the DCI that the DCI is for the beam update.

Aspect 29 is the method of aspect 28, wherein the TCI state indicates at least two uplink channels.

Aspect 30 is the method of any of aspects 28-29, further comprising: transmitting a downlink transmission using the beam based on the TCI state.

Aspect 31 is the method of any of aspects 28-30, wherein the TCI state indicates at least two downlink channels.

Aspect 32 is the method of any of aspects 28-31, further comprising: receiving an uplink transmission based on the beam update; and transmitting a downlink transmission based on the beam update.

Aspect 33 is the method of any of aspects 28-32, wherein the DCI comprises a sequence associated with the beam update.

Aspect 34 is the method of any of aspects 28-33, wherein the DCI further comprises beam indication information comprising a TCI state ID of the TCI state that indicates the beam.

Aspect 35 is the method of any of aspects 28-34, wherein the sequence is different from a sequence used for scheduling a transmission.

Aspect 36 is the method of any of aspects 28-35, wherein a CRC associated with the DCI is scrambled with a CS-RNTI, and wherein the sequence is different from a sequence used for SPS PDSCH activation or release.

Aspect 37 is the method of any of aspects 28-35, wherein a CRC associated with the DCI is scrambled with a C-RNTI, and wherein the sequence is a combination of one or more of: a RV field, a FDRA field, a TDRA field, a HARQ process number field, or a MCS field.

Aspect 38 is the method of any of aspects 28-35, wherein a CRC associated with the DCI is scrambled with a C-RNTI, and wherein the sequence is a combination of one or more of: a RV field, a NDI field, a FDRA field, a HARQ process number field, or a MCS field.

Aspect 39 is the method of any of aspects 28-38, wherein the DCI does not schedule a transmission.

Aspect 40 is the method of any of aspects 28-35, wherein a CRC associated with the DCI is scrambled with a BU-RNTI dedicated for beam updating and the UE determines that the DCI indicates the beam update for the uplink, the downlink, or the combination of the uplink and the downlink based on the BU-RNTI.

Aspect 41 is the method of any of aspects 28-40, wherein the DCI comprises a HARQ ID field indicating a TCI state ID of the TCI state that indicates the beam.

Aspect 42 is the method of any of aspects 28-41, wherein the DCI comprises a TCI state ID field indicating the TCI state that indicates the beam, and wherein the DCI is used for scheduling the beam when: a channel for the beam update, a reference signal and target channel, and a scheduled channel are a same channel; or a beam for the scheduled channel and a beam for the beam update are defined in a common TCI state.

Aspect 43 is the method of any of aspects 28-42, wherein the DCI comprises a dedicated field indicating that the beam update is for the uplink, the downlink, or the combination of the uplink and the downlink.

Aspect 44 is the method of any of aspects 28-43, wherein a payload of the DCI is configured via RRC signaling.

Aspect 45 is the method of any of aspects 28-34 and 42-44, wherein the DCI schedules an uplink transmission or a downlink transmission.

Aspect 46 is the method of any of aspects 28-45, further comprising: prior to determining that the DCI is associated with a beam update, receiving a second stage message including a second DCI or a medium access control MAC-CE in a PDCCH or a PDSCH scheduled by the DCI.

Aspect 47 is the method of any of aspects 28-46, wherein the DCI is of a format used for beam update.

Aspect 48 is the method of any of aspects 28-47, wherein a dedicated SS is configured at the UE for monitoring the DCI.

Aspect 49 is the method of any of aspects 28-48, further comprising transmitting a non-dedicated acknowledgment in acknowledging reception of the DCI, wherein the DCI schedules a downlink transmission or an uplink transmission.

Aspect 50 is the method of any of aspects 28-49, further comprising receiving a dedicated acknowledgment acknowledging reception of the DCI, wherein the DCI does not schedule a downlink transmission or an uplink transmission.

Aspect 51 is the method of any of aspects 28-50, further comprising transmitting a new beam indication after a period of time after transmitting the acknowledgment.

Aspect 52 is the method of any of aspects 28-51, wherein the period of time is determined based on a set of UE capability metrics of the UE.

Aspect 53 is the method of any of aspects 28-52, wherein the period of time is determined based on a tone spacing of a CC receiving the DCI and a tone spacing of a CC transmitting the acknowledgment.

Aspect 54 is an apparatus for wireless communication including at least one processor coupled to a memory and configured to implement a method as in any of aspects 1 to 27.

Aspect 55 is an apparatus for wireless communication including at least one processor coupled to a memory and configured to implement a method as in any of aspects 28 to 53.

Aspect 56 is an apparatus for wireless communication including means for implementing a method as in any of aspects 1 to 27.

Aspect 57 is an apparatus for wireless communication including means for implementing a method as in any of aspects 28 to 53.

Aspect 58 is a computer-readable medium storing computer executable code, where the code when executed by a processor causes the processor to implement a method as in any of aspects 1 to 27.

Aspect 59 is a computer-readable medium storing computer executable code, where the code when executed by a processor causes the processor to implement a method as in any of aspects 28 to 53.

What is claimed is:

1. A method of wireless communication at a user equipment (UE), comprising:
receiving downlink control information (DCI);
determining, based on the DCI, whether the DCI is associated with a beam update for at least one of uplink or a combination of the uplink and downlink; and
determining, from the DCI, a transmission configuration indicator (TCI) state that indicates a beam for at least one of the uplink or the combination of the uplink and the downlink, wherein a cyclic redundancy check (CRC) associated with the DCI is scrambled with a beam-update network temporary identifier (RNTI) (BU-RNTI) dedicated for beam updating.

2. The method of claim 1, wherein the UE determines that the beam update is for the uplink, the method further comprising:
transmitting an uplink transmission using the beam based on the TCI state.

3. The method of claim 2, wherein the TCI state indicates at least two uplink channels.

4. The method of claim 1, wherein the UE determines that the beam update is for the downlink, the method further comprising:
receiving a downlink transmission using the beam based on the TCI state.

5. The method of claim 4, wherein the TCI state indicates at least two downlink channels.

6. The method of claim 1, wherein the UE determines that the beam update is for the uplink and the downlink, the method further comprising:
transmitting an uplink transmission based on the beam update; and
receiving a downlink transmission based on the beam update.

7. The method of claim 1, wherein the DCI schedules an uplink transmission or a downlink transmission.

8. The method of claim 1, wherein the DCI is of a format used for the beam update.

9. The method of claim 1, wherein a dedicated search space (SS) is configured at the UE for monitoring the DCI.

10. A method of wireless communication at a user equipment (UE), comprising:
receiving downlink control information (DCI);
determining, based on the DCI, that the DCI is associated with a beam update for uplink, downlink, or a first combination of the uplink and the downlink; and
determining, from the DCI, a transmission configuration indicator (TCI) state that indicates a beam for the uplink, the downlink, or the first combination of the uplink and the downlink, wherein the DCI comprises a sequence associated with the beam update, and wherein the UE determines that the DCI is associated with the beam update based on the sequence,
wherein the sequence is different from a first sequence used for scheduling a transmission,
wherein the sequence is different from a second sequence used for semi-persistent scheduling (SPS) physical downlink shared channel (PDSCH) activation or release,
wherein the sequence is a second combination of one or more of: a redundancy version (RV) field, a frequency domain resource allocation (FDRA) field, a time domain resource allocation (TDRA) field, a hybrid automatic repeat request (HARQ) process number field, or a modulation and coding scheme (MCS) field, or
wherein the sequence is a third combination of one or more of: the RV field, a new data indicator (NDI) field, the FDRA field, the HARQ process number field, or the MCS field.

11. The method of claim 10, wherein the DCI further comprises beam indication information comprising a TCI state identifier (ID) of the TCI state that indicates the beam.

12. The method of claim 10, wherein the sequence is different from the first sequence used for scheduling the transmission.

13. The method of claim 10, wherein a cycle redundancy check (CRC) associated with the DCI is scrambled with a configured scheduling-radio network temporary identifier (RNTI) (CS-RNTI), and wherein the sequence is different from the second sequence used for the SPS PDSCH activation or release.

14. The method of claim 10, wherein a cyclic redundancy check (CRC) associated with the DCI is scrambled with a cell-radio network temporary identifier (RNTI) (C-RNTI), and wherein the sequence is the first combination of one or more of: the RV field, the FDRA field, the TDRA field, the HARQ process number field, or the MCS field.

15. The method of claim 10, wherein a cyclic redundancy check (CRC) associated with the DCI is scrambled with a cell-radio network temporary identifier (RNTI) (C-RNTI), and wherein the sequence is the second combination of one or more of: the RV field, the NDI field, the FDRA field, the HARQ process number field, or the MCS field.

16. The method of claim 10, wherein the DCI does not schedule the transmission.

17. A method of wireless communication at a user equipment (UE), comprising:
receiving downlink control information (DCI);
determining, based on the DCI, whether the DCI is associated with a beam update for uplink, downlink, or a combination of the uplink and the downlink; and
determining, from the DCI, a transmission configuration indicator (TCI) state that indicates a beam for the uplink, the downlink, or the combination of the uplink and the downlink, wherein a cyclic redundancy check (CRC) associated with the DCI is scrambled with a beam-update network temporary identifier (RNTI) (BU-RNTI) dedicated for beam updating and the UE determines that the DCI indicates the beam update for the uplink, the downlink, or the combination of the uplink and the downlink based on the BU-RNTI.

18. The method of claim 17, wherein the DCI comprises a hybrid automatic repeat request (HARQ) identifier (ID) field indicating a TCI state identifier (ID) of the TCI state that indicates the beam.

19. The method of claim 17, wherein the DCI comprises a TCI state identifier (ID) field indicating the TCI state that indicates the beam, and wherein the DCI is used for scheduling the beam when:
a channel for the beam update, a reference signal and target channel, and a scheduled channel are a same channel; or
a first beam for the scheduled channel and a second beam for the beam update are defined in a common TCI state.

20. The method of claim 1, wherein the DCI comprises a dedicated field indicating that the beam update is for the uplink, the downlink, or the combination of the uplink and the downlink.

21. The method of claim 20, wherein a payload of the DCI is configured via radio resource control (RRC) signaling.

22. A method of wireless communication at a user equipment (UE), comprising:
receiving downlink control information (DCI);
prior to determining that the DCI is associated with a beam update, receiving a second stage message including a second DCI or a medium access control (MAC) control element (CE) (MAC-CE) in a physical downlink control channel (PDCCH) or a physical downlink shared channel (PDSCH) scheduled by the DCI;
determining, based on the DCI, whether the DCI is associated with the beam update for uplink, downlink, or a combination of the uplink and the downlink; and
determining, from the DCI, a transmission configuration indicator (TCI) state that indicates a beam for the uplink, the downlink, or the combination of the uplink and the downlink.

23. A method of wireless communication at a user equipment (UE), comprising:
receiving downlink control information (DCI);
determining, based on the DCI, whether the DCI is associated with a beam update for uplink, downlink, or a combination of the uplink and the downlink;
determining, from the DCI, a transmission configuration indicator (TCI) state that indicates a beam for the uplink, the downlink, or the combination of the uplink and the downlink; and
transmitting a non-dedicated acknowledgment in acknowledging reception of the DCI, wherein the DCI schedules a downlink transmission or an uplink transmission.

24. A method of wireless communication at a user equipment (UE), comprising:
receiving downlink control information (DCI);
determining, based on the DCI, whether the DCI is associated with a beam update for uplink, downlink, or a combination of the uplink and the downlink;
determining, from the DCI, a transmission configuration indicator (TCI) state that indicates a beam for the uplink, the downlink, or the combination of the uplink and the downlink; and
transmitting a dedicated acknowledgment acknowledging reception of the DCI, wherein the DCI does not schedule a downlink transmission or an uplink transmission.

25. The method of claim 24, further comprising receiving a new beam indication after a period of time after transmitting the dedicated acknowledgment.

26. The method of claim 25, wherein the period of time is determined based on a set of UE capability metrics of the UE.

27. The method of claim 25, wherein the period of time is determined based on a first tone spacing of a first component carrier (CC) receiving the DCI and a second tone spacing of a second CC transmitting the dedicated acknowledgment.

28. An apparatus for wireless communication at a user equipment (UE), comprising:
a memory; and
at least one processor coupled to the memory and configured to:
receive downlink control information (DCI);
determine, based on the DCI, that the DCI is associated with a beam update for at least one of uplink, downlink, or a first combination of the uplink and the downlink; and
determine, from the DCI, a transmission configuration indicator (TCI) state that indicates a beam for the uplink, the downlink, or the first combination of the uplink and the downlink, wherein the DCI comprises a sequence associated with the beam update, and wherein the sequence indicates that the DCI is associated with the beam updates,
wherein the sequence is different from a first sequence used for scheduling a transmission,
wherein the sequence is different from a second sequence used for semi-persistent scheduling (SPS) physical downlink shared channel (PDSCH) activation or release,
wherein the sequence is a second combination of one or more of: a redundancy version (RV) field, a frequency domain resource allocation (FDRA) field, a time domain resource allocation (TDRA) field, a hybrid automatic repeat request (HARQ) process number field, or a modulation and coding scheme (MCS) field, or
wherein the sequence is a third combination of one or more of: the RV field, a new data indicator (NDI) field, the FDRA field, the HARQ process number field, or the MCS field.

29. The apparatus of claim 28, wherein the DCI does not schedule the transmission.

30. The apparatus of claim 28, wherein the DCI further comprises beam indication information comprising a TCI state identifier (ID) of the TCI state that indicates the beam.

31. The apparatus of claim 28, wherein the sequence is different from the first sequence used for scheduling the transmission.

32. The apparatus of claim 28, wherein a cyclic redundancy check (CRC) associated with the DCI is scrambled with a configured scheduling-radio network temporary identifier (RNTI) (CS-RNTI), and wherein the sequence is different from the second sequence used for the SPS PDSCH activation or release.

33. A method of wireless communication at a base station comprising:
transmitting downlink control information (DCI) indicating a beam update for at least one of uplink or a combination of the uplink and downlink; and
indicating in the DCI that the DCI is for the beam update, wherein a cyclic redundancy check (CRC) associated with the DCI is scrambled with a beam-update network temporary identifier (RNTI) (BU-RNTI) dedicated for beam updating.

34. An apparatus for wireless communication at a base station comprising:
a memory; and
at least one processor coupled to the memory and configured to:
transmit downlink control information (DCI) indicating a beam update for at least one of uplink or a combination of the uplink and downlink; and
indicate in the DCI that the DCI is for the beam update, wherein a cyclic redundancy check (CRC) associated with the DCI is scrambled with a beam-update network temporary identifier (RNTI) (BU-RNTI) dedicated for beam updating.

* * * * *